United States Patent [19]

Manzone

[11] Patent Number: 4,497,690
[45] Date of Patent: Feb. 5, 1985

[54] DISTILLATION

[75] Inventor: Richard R. Manzone, Fairhaven, Mass.

[73] Assignee: Hoyt Manufacturing Corporation, Westport, Mass.

[21] Appl. No.: 379,664

[22] Filed: May 19, 1982

[51] Int. Cl.³ .............................................. B01D 3/02
[52] U.S. Cl. ................................ 202/181; 202/185 E; 202/187; 202/206
[58] Field of Search .......... 202/168, 169, 170, 170 D, 202/185 E, 206, 83, 176, 177, 187, 181

[56] References Cited

U.S. PATENT DOCUMENTS

| 853,986 | 5/1907 | Ludlow et al. | 202/170 |
|---|---|---|---|
| 1,481,326 | 1/1924 | Matheson | 202/176 |
| 2,004,375 | 6/1935 | Martin | 202/163 |
| 2,042,713 | 6/1936 | Gray | 202/177 |
| 2,083,012 | 6/1937 | Eastwood | 87/6 |
| 2,385,564 | 9/1945 | Booth et al. | 202/170 |
| 2,549,388 | 4/1951 | Rivers | 202/69 |
| 3,011,956 | 12/1961 | Smith et al. | 202/206 |
| 3,020,214 | 2/1962 | Beduhn et al. | 202/181 |
| 3,341,429 | 9/1967 | Fondrk | 203/95 |
| 3,380,895 | 4/1968 | Loebel | 202/176 |
| 3,422,887 | 1/1969 | Berkeley | 165/113 |
| 3,483,092 | 12/1969 | Young | 202/206 |
| 3,674,650 | 7/1972 | Fine | 202/176 |

FOREIGN PATENT DOCUMENTS 318118 6/1934 Italy ................................ 202/170 D Primary Examiner—Frank Sever

[57] ABSTRACT

A still comprising, in one aspect, a housing, a heating coil located inside the housing, a condensing coil located inside the housing and above the heating coil with vapor flow space inside turns of the coil, and having a diameter smaller than the housing which defines a vapor flow space outside turns of the coil, and means to remove condensate from the housing.

15 Claims, 2 Drawing Figures

DISTILLATION

BACKGROUND OF THE INVENTION

This invention relates to the distillation of liquids such as perchloroethylene.

Typically such distillation takes place in a still in which a heating coil is located at the bottom of the still, a condensing coil is located at the top of the still, and means are provided to collect condensate and remove it from the still.

SUMMARY OF THE INVENTION

In general, the invention features in one aspect, a still having a housing, a heating coil located inside the housing, a condensing coil, mounted above the heating coil in the housing, the condensing coil having a diameter smaller than the housing to define a vapor flow space between the housing and the condensing coil, the condensing coil having further vapor flow space inside its turns, and means for removing condensate from the housing to the exterior of the housing. This arrangement permits vapor to impinge upon the condensing coil from both inside and outside the coil turns, resulting in increased surface area for condensation.

In another aspect the invention features a still having a removable cover forming the top wall of the housing, and a condensing coil, mounted above the heating coil in the housing, having inlet and outlet pipes that are affixed to the cover. The cover and the condensing coil are then removable only as a unit, so that the still cannot be operated without the cover in place, providing a safety feature.

In another aspect the invention features a still having a heating coil located inside the housing, the heating coil extending upward to right angle bends which enter and exit the housing at a point above the midplane of the housing, the housing being filled with liquid to a level which covers the heating coil but it below the right angle bends, to avoid liquid sealing problems.

In another aspect the invention features a still having a circular defoaming screen located below the condensing coil, the housing being filled with liquid to a level below the defoaming screen. The defoaming screen breaks up foam, which allows the condenser coil to be mounted closer to the liquid level to decrease the height of the housing.

In preferred embodiments, the still has a condensing coil of helical construction with adjacent turns located in horizontal planes; a post-distillation contaminent entrainment system in which a stream of water is continuously flowed over the condensate to remove contaminents; steam pressure regulation apparatus for the heating coil which includes a low pressure steam regulator, with a range of 10-50 p.s.i., a high pressure steam regulator, with a range of 30-125 p.s.i. and a selector switch to select the low pressure regulator for distillation operation or the high pressure regulator for cookdown operation; and automatic still shut-off circuits activated by rapid temperature increases, insufficient coolant flow in the condenser coil or overfilling of the housing with liquid.

Other features and advantages of the invention will be apparent from the following description of the preferred embodiment thereof, and from the claims.

DESCRIPTION OF THE PREFERRED EMBODIMENT

We now turn to the structure and operation of the preferred embodiment, first briefly describing the drawings thereof.

DRAWINGS

STRUCTURE

Figure 1:
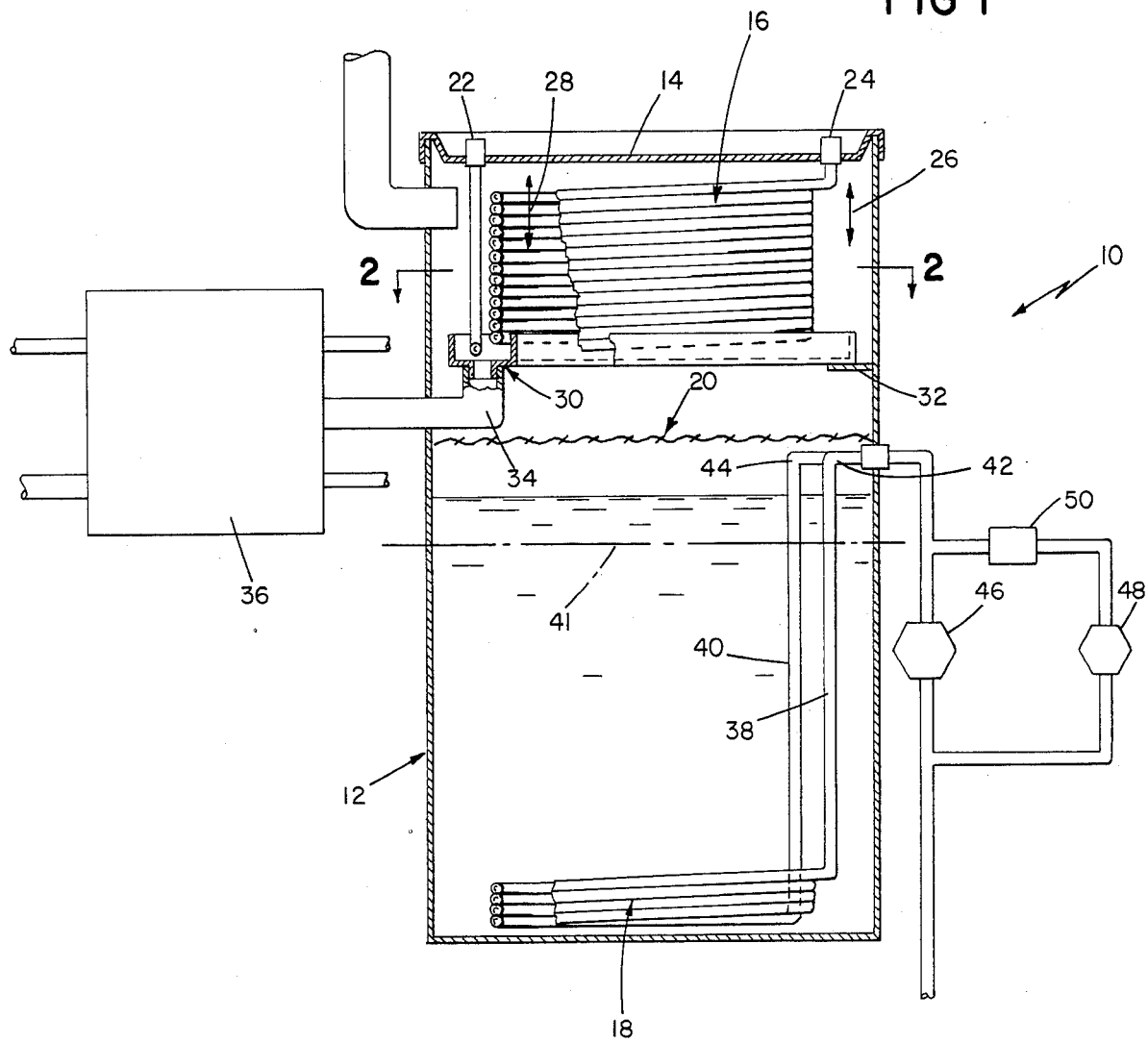
FIG. 1 is a side view, partly in section, of a perchloroethylene still.
Figure 2:
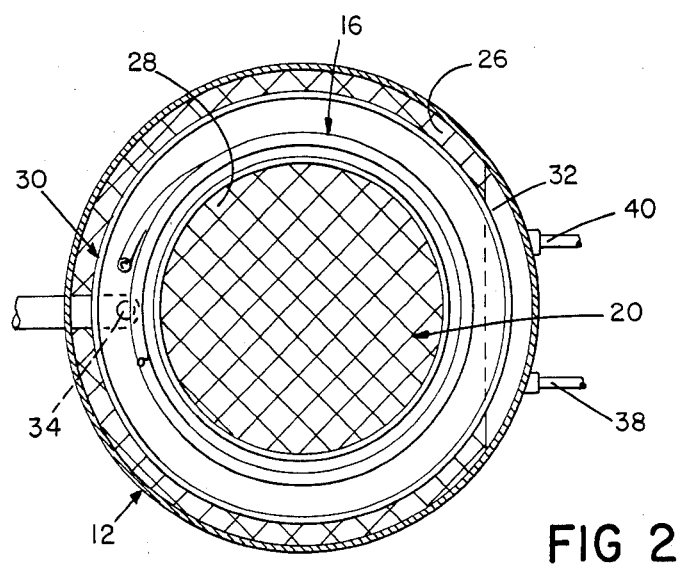
FIG. 2 is a sectional view taken along 2—2 of FIG. 1.

Referring to the drawings, perchloroethylene still 10 has a cylindrical housing 12 and a cover 14.

Condenser coil 16 is suspended from cover 14 by inlet 22 and outlet 24 which pass through and are affixed to cover 14 so that the coil and cover can only be removed as a single unit. Coil 16 has a diameter substantially less than that of housing 12 so as to provide a vapor flow space 26 between the housing and the coil as well as vapor flow space 28 inside the coil.

Condenser collection tray 30, located just beneath coil 16, rests on flange 32 and drainpipe 34, and is connected via the drainpipe to conventional post-distillation contaminent entrainment system 36.

Heating coil 18, located at the bottom of housing 12, has steam inlet pipe 38 and steam return pipe 40 which extend upward to above the midplane 41 of the housing, where they exit via right angle bends 42, 44.

Pipes 38, 40 are connected to an external steam source with two pressure regulators 46, 48 (operating range 10-15 p.s.i. and 30-125 p.s.i. respectively, controlled by selector switch 50, connected in parallel between the external steam source and the steam inlet.

Defoaming screen 20 is located below coil 16 but just above right angle bends 42, 44.

OPERATION

Housing 12 is filled with liquid perchloroethylene to a level below the point where the heating coil exits the housing via right angle bends 42, 44.

Selector switch 50 is then positioned to connect pressure regulator 46 between the heating coil and the external steam source for distillation operation. As the coil heats up it vaporizes perchloroethylene, which rises and passes through the defoaming screen, which breaks up foam. The vapor strikes the inside and outside surfaces of condensing coil 16, filling vapor flow spaces 26, 28. Coil 16 condenses the vapor to liquid, which collects in tray 30 and leaves the still via drainpipe 34 to enter entrainment system 36 where the liquid perchloroethylene and contaminents are separated.

Following the distillation operation the selector switch is positioned to connect pressure regulator 48 between the heating coil and the external steam source for cookdown operation. After completion of the cookdown phase the selector switch is re-positioned to repeat distillation operation.

Having the heating coil exit the still above the liquid level eliminates leakage of perchloroethylene fluid at this point.

The use of selector switch 50 eliminates the need to repetitively readjust a steam pressure regulator for distillation or cookdown operation because by merely setting the switch to the proper position a pre-adjusted regulator for distillation operation or a pre-adjusted regulator for cookdown can be selected.

The use of a defoaming screen allows a decrease in the overall height of the still because it allows a decrease in the distance between the liquid level and the condenser coil.

The use of vapor flow spaces 26, 28 on the inside and outside surfaces of the condenser coil increases the surface area for condensation, thereby increasing the overall rate of perchloroethylene condensation.

Attachment of the condensor coil to cover 14 renders the still inoperative when the cover is removed to perform maintenance.

Other embodiments are within the following claims. For example, the invention is applicable to distillation of other non-flammable liquids; switch 50 could be a valve; and a second defoaming screen could be (and preferably is) added above screen 20 (preferably with about 2 inches separation between the screens).

I claim:

1. A still having enhanced condensation efficiency comprising:
   a cylindrical housing,
   a heating coil located inside said housing,
   means for maximizing condensation efficiency, including
   a condensing coil, mounted above said heating coil in said housing,
   said condensing coil having a diameter smaller than said cylindrical housing to define a vapor flow space between said cylindrical housing and said condensing coil, said condensing coil having further vapor flow space inside its turns, said turns being designed, dimensioned and arranged such that a segment of the inside thereof and a segment of the outside thereof are available for vapor condensation, and
   means for removing condensate from said housing to said exterior of said housing.

2. The still of claim 1 wherein said housing further comprises a removable cover forming the top wall of said housing, said condensing coil comprises inlet and outlet pipes affixed to said cover, and said condensing coil and said cover are only removable together.

3. The still of claim 1 wherein said heating coil extends upward to right angle bends, which enter and exit the side of said housing at a point above the midplane of said housing, said housing being filled with liquid below said right angle bends.

4. The still of claim 1, wherein said housing is filled with liquid, further comprising a circular defoaming screen located below said condensing coil and above the liquid level in said housing.

5. The still of claim 1 further comprising a post-distillation contaminant entrainment system wherein a stream of water is continuously flowed over said condensate to remove contaminant.

6. The still of claim 5 wherein said steam pressure regulation apparatus includes said low pressure steam regulator with a range of 10–50 p.s.i., and said high pressure steam regulator with a range of 30–125 p.s.i.

7. The still of claim 5 wherein said low pressure steam regulator is used for distillation operation and said high pressure steam regulator is used for cookdown operation.

8. A still comprising means for disenabling condensation during conditions when operation would be unsafe, said still comprising:
   a housing,
   a removable cover forming the top wall of said housing,
   a heating coil located inside said housing,
   a condensing coil, mounted above said heating coil in said housing, said disenabling means comprising inlet and outlet pipes that are affixed to said cover, said cover and said condensing coil being designed, sized and arranged to be only removable together and condensation is disenabled when said cover is removed, and
   means for removing condensate from said housing to said exterior of said housing.

9. A still having means for reducing the opportunity for liquid leakage comprising:
   a housing,
   a heating coil located inside said housing comprising piping,
   said liquid-leakage reducing means comprising heating coil piping extended upward to right angle bends which enter and exit the side of said housing at a point above the midplane of said housing, said housing having means for limiting the liquid to a level which covers said heating coil, said level being below said right angle bends to avoid liquid sealing problems, said coil being designed, sized and arranged to exit said housing only above said liquid level,
   a condensing coil, mounted above said heating coil in said housing, and
   means for removing condensate from said housing to said exterior of said housing,
   whereby the heating coil does not exit the housing at a point below said liquid level, thus avoiding potential liquid leakage sites.

10. A still comprising:
    a housing,
    a heating coil located inside said housing for vaporizing liquid,
    a condensing coil, mounted a distance above said heating coil in said housing sufficient that during still operation foam formed in said vaporizing liquid does not contact said condensing coil,
    means for removing condensate from said housing to said exterior of said housing, and
    means for enhancing the compactness of said still comprising a circular defoaming screen located below said condensing coil, said housing having means for limiting liquid to a level below said defoaming screen, whereby the height of the foam formed in said vaporizing liquid is reduced.

11. The still of claim 1, 8, 9 or 10 wherein said condensing coil is of helical construction with adjacent turns located in horizontal planes.

12. The still of claim 1, 8, 9 or 10 further comprising steam pressure regulation apparatus for said heating coil, including
    a low pressure steam regulator,
    a high pressure steam regulator, and
    selector means that enables selection of said low pressure steam regulator or said high pressure steam regulator.

13. The still of claim 1, 8, 9 or 10 further comprising an automatic still shut-off circuit activated by a rapid temperature increase.

14. The still of claim 1, 8, 9 or 10 further comprising an automatic still shut-off circuit activated by insufficient coolant flow in said condensor coil.

15. The still of claim 1, 8, 9 or 10 further comprising an automatic still shut-off circuit activated by overfilling said housing with fluid.

* * * * *